(12) United States Patent
Dally

(10) Patent No.: US 9,178,421 B2
(45) Date of Patent: Nov. 3, 2015

(54) MULTI-STAGE POWER SUPPLY WITH FAST TRANSIENT RESPONSE

(71) Applicant: NVIDIA Corporation, Santa Clara, CA (US)

(72) Inventor: William James Dally, Los Altos Hills, CA (US)

(73) Assignee: NVIDIA Corporation, Santa Clara, CA (US)

(*) Notice: Subject to any disclaimer, the term of this patent is extended or adjusted under 35 U.S.C. 154(b) by 318 days.

(21) Appl. No.: 13/663,903

(22) Filed: Oct. 30, 2012

(65) Prior Publication Data

US 2014/0117951 A1 May 1, 2014

(51) Int. Cl.
*H02M 3/158* (2006.01)
*H02M 3/156* (2006.01)
*H02M 1/00* (2007.01)

(52) U.S. Cl.
CPC ........ *H02M 3/158* (2013.01); *H02M 2001/007* (2013.01); *H02M 2003/1566* (2013.01)

(58) Field of Classification Search
CPC .............. H02M 2001/007; H02M 2003/1566; H02M 3/158; H02M 3/1582
USPC ................................. 323/259, 266, 271, 282
See application file for complete search history.

(56) References Cited

U.S. PATENT DOCUMENTS

| | | | |
|---|---|---|---|
| 5,132,606 A | 7/1992 | Herbert | |
| 6,198,642 B1 * | 3/2001 | Kociecki | 363/37 |
| 6,469,478 B1 | 10/2002 | Curtin | |
| 6,798,177 B1 | 9/2004 | Liu et al. | |
| 6,975,098 B2 * | 12/2005 | Vinciarelli | 323/266 |
| 7,242,168 B2 * | 7/2007 | Muller et al. | 323/222 |
| 7,688,046 B2 * | 3/2010 | Li et al. | 323/266 |
| 2005/0083736 A1 * | 4/2005 | Fukui et al. | 365/185.18 |
| 2005/0184712 A1 | 8/2005 | Wei et al. | |
| 2005/0184713 A1 * | 8/2005 | Xu et al. | 323/282 |
| 2008/0055940 A1 | 3/2008 | Lawson et al. | |

(Continued)

FOREIGN PATENT DOCUMENTS

| CN | 101610038 B | 5/2011 |
|---|---|---|
| DE | 112008003489 T5 | 11/2010 |

(Continued)

OTHER PUBLICATIONS

Examination Report from German Patent Application No. 10 2013 219 807.8, dated Aug. 4, 2014.

(Continued)

*Primary Examiner* — Fred E Finch, III
(74) *Attorney, Agent, or Firm* — Zilka-Kotab, P.C.

(57) ABSTRACT

Embodiments are disclosed relating to an electric power conversion device and methods for controlling the operation thereof. One disclosed embodiment provides a multi-stage electric power conversion device including a first regulator stage including a first stage energy storage device and a second regulator stage including a second stage energy storage device, the second stage energy storage device being operatively coupled between the first stage energy storage device and the load. The device further includes a control mechanism operative to control (i) a first stage output voltage on a node between the first stage energy storage device and the second stage energy storage device and (ii) a second stage output voltage on a node between the second stage energy storage device and the load.

20 Claims, 4 Drawing Sheets

(56) References Cited

U.S. PATENT DOCUMENTS

| | | | |
|---|---|---|---|
| 2008/0136390 A1* | 6/2008 | Briere | 323/282 |
| 2008/0266917 A1* | 10/2008 | Lin et al. | 363/80 |
| 2009/0027925 A1* | 1/2009 | Kanouda et al. | 363/21.13 |
| 2009/0039852 A1 | 2/2009 | Fishelov et al. | |
| 2009/0153124 A1* | 6/2009 | Ishii | 323/290 |
| 2009/0206663 A1* | 8/2009 | Liu | 307/31 |
| 2009/0295343 A1 | 12/2009 | Chiu | |
| 2010/0209792 A1 | 8/2010 | Umayahara et al. | |
| 2010/0244788 A1 | 9/2010 | Chen | |
| 2011/0089915 A1* | 4/2011 | Qiu et al. | 323/271 |
| 2011/0204858 A1* | 8/2011 | Kudo | 323/266 |
| 2012/0153907 A1* | 6/2012 | Carobolante et al. | 323/266 |
| 2012/0319478 A1* | 12/2012 | Gentchev et al. | 307/28 |
| 2014/0097813 A1* | 4/2014 | Daily | 323/272 |

FOREIGN PATENT DOCUMENTS

| | | |
|---|---|---|
| EP | 2608377 A1 | 6/2013 |
| WO | 0169768 A1 | 9/2001 |

OTHER PUBLICATIONS

Office Action from Taiwan Patent Application No. 102135505, dated Dec. 15, 2014.

Office Action from Taiwan Patent Application No. 102135505, dated May 7, 2015.

\* cited by examiner

MULTI-STAGE POWER SUPPLY WITH FAST TRANSIENT RESPONSE

BACKGROUND

Power supplies play an important role in the performance of microprocessors and other electronic devices. Power supplies must provide an appropriate amount of current and voltage over a range of operating conditions. Current and voltage must be supplied in an efficient and stable manner at steady state, and as conditions change the power supply must respond quickly to transient demands, such as an increase or decrease in the amount of current drawn by a load. As components come "online," for example, current demands may increase dramatically, and demand in turn will decrease significantly as components go "offline." For example, a graphics processing unit ("GPU") may utilize a small amount of current most of the time, but may also require a substantial increase in current as a new frame is generated and the appropriate components are brought into operation. If such demands occur and sufficient power is not available, the voltage provided to the components may drop below a critical voltage, thus potentially effecting undesirable operation. As such, typical electric power conversion devices (e.g., voltage regulators) may utilize one or more energy storage devices, such as capacitors and inductors, in order to ensure that enough energy is available to provide the desired current. However, as the storage devices increase in size, the ability to respond quickly is proportionally diminished.

DETAILED DESCRIPTION

Circuits and other electronic devices can be configured to receive electric power from one or more electric power sources. For example, mobile computing devices may be configured to receive electric power from a battery and/or from a mains power system (i.e., "line power"), while other devices may be configured to receive electric power from one or more other sources (e.g., generator, solar panel, etc.). Regardless of the source of the electric power, the electric power is typically delivered at a particular voltage and frequency, and is typically either delivered as alternating current "AC" or direct current "DC." However, one or more components of a given electronic device may not be configured to directly utilize the provided electric power. For example, although mains electricity in the United States is typically delivered as 120V of alternating current at 60 Hz, a particular electronic device may be configured to utilize 12V DC power. Therefore, the power is converted (e.g., voltage is rectified and stepped-down) by various mechanisms, or a combination of mechanisms, before being utilized by the electronic device. Accordingly, various approaches utilizing a variety of electric and electronic components exist in order to provide such power conversion.

To provide a desired output (e.g., desired frequency, voltage, current, phase, etc.), typical electric power conversion devices are configured to operate over a range of operating conditions. For example, electricity demanded by a high-performance electronic device, such as a CPU or GPU, may fluctuate with time. Specifically, as various components of such devices come online (e.g., upon rendering a new frame in a GPU, logic block restarting after a stall, start of a large computation, etc.), there may be a rapid rise in current demand. Similarly, when one or more components go offline (e.g., upon entering a low-power mode), there may be a rapid fall in current demand. As such, typical electric power conversion devices are configured such that the voltage level during either of these instances is within a desired threshold.

Figure 1:
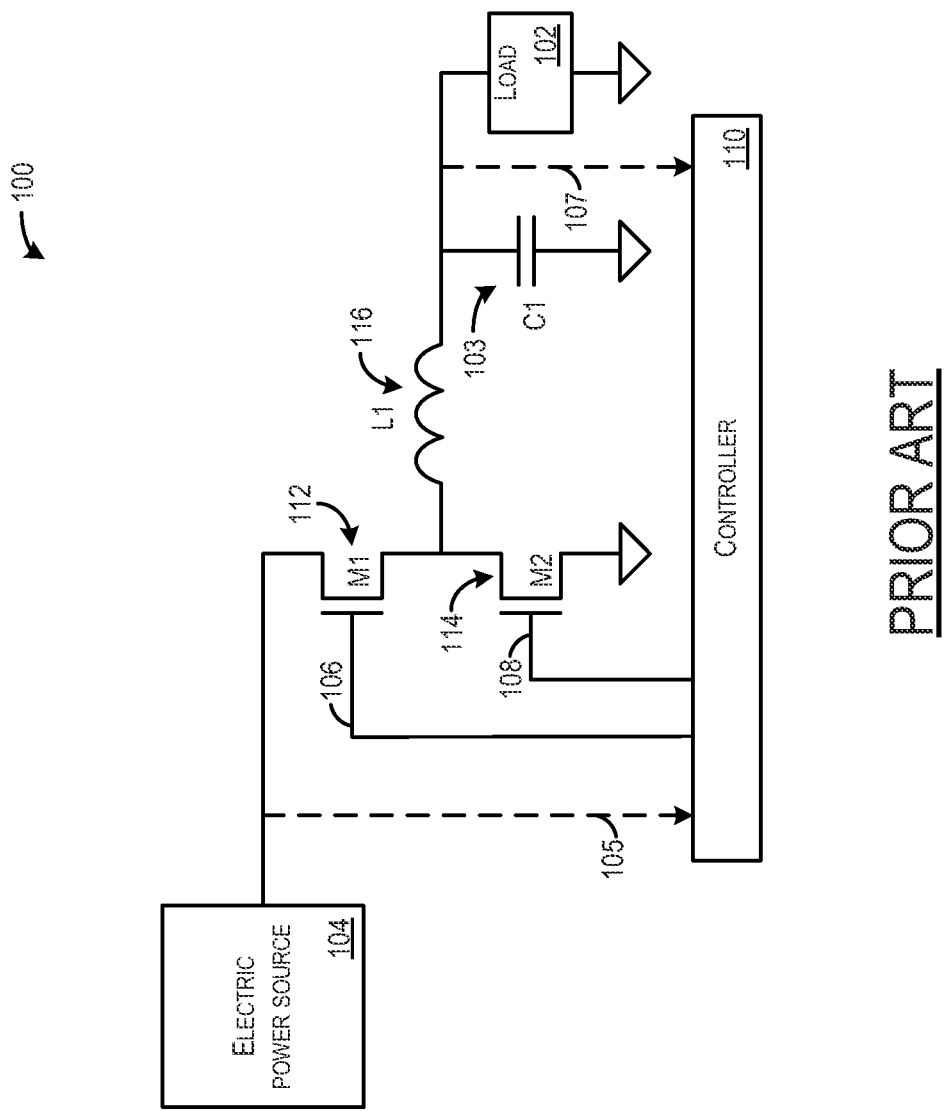
FIG. 1 schematically illustrates a typical electric power conversion device.

Turning now to FIG. 1, a typical power conversion device 100 is shown. Device 100 is configured to provide a desired output (e.g., 1V DC) to load 102 (e.g., logic "blocks," etc.) and capacitor 103 by converting power received from electric power source 104 (e.g., battery, mains power, etc.). For example, by modulating the duty factor of control signals 106 and 108 (e.g., PWM signals, PFM signals, etc.), controller 110 is configured to selectively enable transistors 112 and 114, respectively. In order to provide dynamic modulation of the control signals, controller 110 may be configured to monitor one or more characteristics (e.g., node voltage, branch current, etc.) of device 100, and may thus incorporate such information (e.g., feedback signals) into one or more control loops and/or different logic in order to effect such modulation. For example, controller 110 may be configured to receive feedback signals 105 and 107 corresponding to a voltage at an input node (e.g., node coupled to electric power source 104) and a voltage at load 102, respectively. In other embodiments, controller 110 may be configured to monitor different and/or additional characteristics of device 100.

In modulating the control signals, controller 110 is able to control the average current flowing through inductor 116. Specifically, by enabling transistor 112, the instantaneous current flowing through inductor 116 is increased, whereas the instantaneous current is decreased by enabling transistor 114. The output voltage provided to load 102 is controlled by controlling the current through inductor 116.

The inductor in FIG. 1 resists changes in current, thereby preventing the stored energy in inductor 116 from being released all at once (e.g., to load 102) when load current changes. This property of inductors, along with the storage capacity of capacitor 103, enables an output voltage at load 102 that is sufficiently stable during steady-state operation. Nonetheless, there is some "ripple" in the voltage at load 102 that depends on the size of inductor 116, the size of capacitor 103, and/or the switching frequency of the controller 110, among other factors. Generally speaking, as the size of inductor 116 increases, the output ripple at steady state proportionally decreases. Accordingly, inductor 116 may be sized large enough in order to provide an output voltage that does not fluctuate outside a desired voltage range. However, it will be appreciated that the tendency of inductor 116 to resist a change in current may impact the ability of device 100 to respond to a rapid increase or decrease in current (referred to as "transients") demanded by load 102. In other words, as inductor 116 increases in size to handle the desired voltage and decrease "ripple," the ability of device 100 to respond to current transients decreases. Device 100 may therefore be limited in its ability to promptly satisfy transient demands.

An example configuration of device 100 (e.g., typical 30 A regulator phase), is as follows. Inductor 116 is 0.5 μH, electric power source 104 provides 12V DC, and the desired output to load 102 is 1V DC. Ignoring the voltage drop across transistor 112 (e.g., due to a small channel resistance) and other non-idealities, the voltage drop across inductor 116 is 11V. As such, the maximum (ideal) current response from inductor 116, defined as the voltage divided by the inductance, is 22 A/μs. Accordingly, providing an extra 10 A of current to load 102 will take at least 500 ns, even ignoring other non-idealities (e.g., time to synchronize control signals 106 and 108 to new demands). While the current being provided by device 100 is less than the current demanded by load 102, the voltage seen at load 102 will begin to drop as capacitor 103 is discharged by the current difference. If the voltage drops too far, load 102 may operate incorrectly. It will be thus appreciated that such performance may be unsatisfactory in some high-performance electronic devices.

If desired voltage characteristics cannot be satisfied, load 102 may be configured to employ various techniques to deal with the provided voltage. For example, load 102 (e.g., computing device), may be configured to "throttle" performance upon detecting a voltage that is outside, or near an extreme of, the desired voltage range. Throttling may include, for example, halting pending operations, decreasing clock frequency to allow greater time for edge transitions, and/or otherwise decreasing throughput.

The configuration shown in FIG. 1 is typically referred to as a "buck" converter. While the present invention is described in the context of this buck converter, one of ordinary skill in the art will understand that this invention can be applied to other "switch-mode" power conversion circuits including, but not limited to, a boost converter, a forward converter, a half-bridge converter, a full-bridge converter, a flyback converter, and/or variants thereof.

Figure 2:
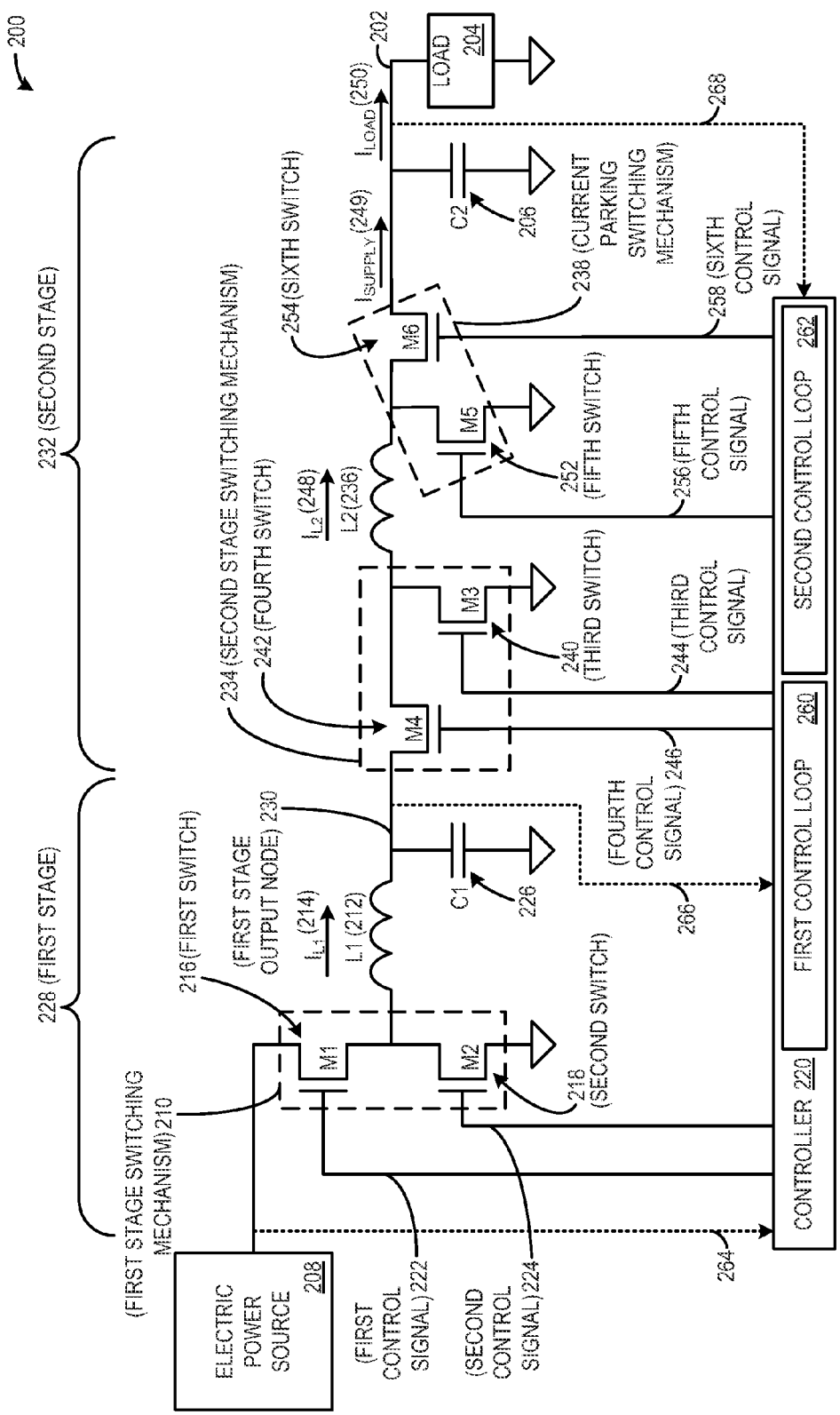
FIG. 2 schematically illustrates an example of an electric power conversion device according to an embodiment of the present disclosure.

FIG. 2 shows an embodiment of a multi-stage electric power conversion device 200 according to an embodiment of the present disclosure. Device 200 is configured to provide a desired output at node 202 (e.g., at load 204 and capacitor 206) by converting power received from electric power source 208 (e.g., battery, mains power, etc.). Although example operation of device 200 will be discussed in greater detail below, generally speaking, device 200 includes a first stage energy storage device (e.g., capacitor 226 and/or inductor 212) and a second stage energy storage device (e.g., second capacitor 206 and/or second inductor 236). Device 200 further includes first stage switching mechanism 210, second stage switching mechanism 234, and current parking switching mechanism 238. As will be explained in greater detail below, the current parking switching mechanism is optional, but when employed, may improve the transient response of device 200.

Each of the foregoing switching mechanisms includes one or more switches (e.g., diodes, transistors, etc.) configured to vary the voltage and/or current at a downstream end of the mechanism. For example, first stage switching mechanism 210 includes first switch 216 and second switch 218; second stage switching mechanism 234 includes third switch 240 and fourth switch 242; and current parking switching mechanism 238 includes fifth switch 252 and sixth switch 254. Although the switches are each shown in FIG. 2 as a single field-effect transistor ("FET"), it will be understood that any other method/apparatus may be employed to perform switching, including the use of multiple devices in parallel to increase current capacity, decrease conduction losses, etc.

In order to provide control over the switches, exemplary device 200 further includes controller 220 configured to apply one or more control signals to each of the switching mechanisms. For example, referring to first stage switching mechanism 210, controller 220 may be configured to provide first control signal 222 and second control signal 224 to switches 216 and 218, respectively. Similarly, controller 220 may be configured to provide control signals 244 and 246 to second stage switching mechanism 234 and control signals 256 and 258 to current parking switching mechanism 238. At times in this discussion, switches 216, 218, 240, 242, 252, and 254 and controller 220 may be referred to collectively as a "control mechanism."

Although described herein as a "set" of control signals provided to each "set" of switches (i.e., switches of a particular switching mechanism), it will be appreciated this designation is not intended to suggest a particular number or configuration of control signals or switches. Instead, it will be understood that controller 220 may be configured to provide any suitable number of control signals to each switching mechanism, and each switching mechanism may include any suitable number of switches, without departing from the scope of the present disclosure.

The control signals may include, for example, PWM ("Pulse Width Modulation") or PFM ("Pulse Frequency Modulation") signals, a combination of PWM and PFM signals, and/or different control signals, in order to selectively enable the switches. Regardless of the specifics of the control signals, control typically will be implemented so that each set of switches includes switches maintained in complementary states. For example, controller 220 typically is configured to provide control signals 222 and 224 to first stage switching mechanism 210 so that both switches 216 and 218 are not concurrently enabled. A scenario in which both switches are enabled could result in a substantially zero-resistance path between the supply of electric power source 208 and ground, thereby potentially damaging device 200 and/or resulting in unsuitably high power usage. Controller 220 may provide the control signals (e.g., via PWM, PFM, etc.) so as to effect toggling of the switches with a particular duty factor. In some embodiments, one or more sets of control signals may be modulated synchronously with any one or more control signal sets, whereas in other embodiments, each control signal set may be modulated asynchronously. Specific operation of the device 200 will now be described in more detail.

First stage switching mechanism 210 is coupled between electric power source 208 and an upstream end of first inductor 212 (L1), and is therefore operable to alternatively couple the upstream end of inductor 212 to the electric power source 208 or to ground. In other words, switches 216 and 218 are configured to "switch" the output of electric power source 208 (e.g., 12V in some scenarios). Accordingly, switches 216 and 218 may each include, for example, one or more parallel-connected power MOSFETs capable of switching such an output. Typical DMOS power MOSFETs may provide slower switching speeds, and may experience greater switching losses, than "planar" MOSFETs.

First stage switching mechanism 210, first inductor 212, and first capacitor 226 cooperate to provide a first regulator stage 228 of the multi-stage electric power conversion device 200. First stage 228 is configured to provide a first stage output voltage at first stage output node 230. Specifically, by alternatively coupling inductor 212 to electric power source 208 or to ground, a first stage output voltage is provided at output node 230 (e.g., by accumulating charge on capacitor 226). In other words, first stage 228 may efficiently generate a desired voltage at first stage output node 230 by toggling switches 216 and 218. In various embodiments, the voltage at first stage output node 230 may be less than an output voltage at node 202 (sometimes referred to herein as a "second stage output voltage"), greater than the output voltage, or substantially equivalent to the output voltage. For example, the first stage output voltage at node 230 may be set to a value higher than an average operational voltage at output node 202. Such a configuration may improve the transient response of device 200, as will be described in greater detail below.

Generally speaking, the first stage output voltage ($V_1$) at first stage output node 230 is related to the input voltage ($V_{in}$) provided via electric power source 208 and the duty factor ($D_1$) of first switch 216 as follows: $V_1 = D_1 \times V_{in}$. Although a particular voltage desired by load 204 may be achieved by the first stage alone, the first stage may be slow to respond to current transients due to the relatively large size of inductor 212, among other factors.

Thus, in order to improve the transient response of device 200, device 200 further includes second regulator stage 232 coupled between first stage output node 230 and load 204. Such a two-stage configuration may provide one or more characteristics, which will be described in greater detail below, that enable device 200 to respond to current transients at load 204 faster than typical single-stage devices (e.g., device 100).

As depicted, second stage 232 includes second stage switching mechanism 234 coupled between first stage output node 230 and the upstream end of second inductor 236. The second stage also includes current parking switching mechanism 238 coupled between the downstream end of second inductor 236 and load 204. If stage 232 is operated as a "step-down" converter (e.g., "buck" converter), for example, switching mechanism 238 may be omitted. Similarly, if the second stage is operated as a "step-up" converter (e.g., "boost" converter), for example, switching mechanism 234 may be omitted. However, it may be desirable to include both switching mechanisms 234 and 238 in order to improve response to current transients, as will be discussed in greater detail below.

Second stage switching mechanism 234 is operable to alternatively couple the upstream end of second inductor 236 to the first stage output node 230 and to ground. Similar to first stage switching mechanism 210, the output voltage ($V_O$) at node 202 is related to the first stage output voltage ($V_1$) at first stage output node 230 and the duty factor ($D_4$) of fourth switch 242 of second switching mechanism 234. For example, when the downstream end of inductor 236 is coupled to load 204 (e.g., where second stage 232 does not include current parking switching mechanism 238 and/or where sixth switch 254 remains enabled), a relationship may be defined as follows: $V_O = D_4 \times V_1$. However, the magnitude of the first stage output voltage is typically substantially less than the magnitude of the input voltage provided by electric power source 208. Thus, switches 240 and 242 are switching lower voltages than switches 216 and 218, and may therefore be constructed from lower-voltage devices, such as "planar" MOSFETs. Such switches may be faster than switches 216 and 218, and may therefore enhance the ability of multi-stage device 200 to respond to current transients and/or reduce switching losses.

Furthermore, such switches may be incorporated onto an integrated circuit including load 204 or in a separate die on the same package as load 204, thereby potentially reducing space used, reducing parasitic inductance, and/or reducing cost due to the lack of discrete components. The switches may be realized as standard-voltage "core" transistors in a typical digital integrated-circuit process, or the mechanisms may be realized as higher-voltage thick-oxide input-output transistors in a typical digital integrated-circuit process. It will be understood that these switches are presented for the purpose of example, and are not intended to be limiting in any manner.

As previously mentioned, second stage 232 may further include current parking switching mechanism 238 in some embodiments. When provided, mechanism 238 is operable to control how much of inductor current 248 in second inductor 236 is delivered via supply current 249 ($I_{SUPPLY}$) to capacitor 206, and hence to load 204. In other words, current parking switching mechanism 238 may be configured to provide none of inductor current 248, substantially all of inductor current 248 (e.g., less current flowing into second capacitor 206, leakage currents, etc.), and/or any desired intermediate amount of inductor current 248, to node 202. As will be discussed in greater detail below, such a configuration may enable inductor current 248 to increase without increasing the current supplied to the load, thereby "parking" the inductor current for responding to current transients while maintaining a desired load current level.

For example, controller 220 may be configured to selectively enable fifth switch 252 and disable sixth switch 254 to disable supply current 249. Specifically, by enabling fifth switch 252, all of the instantaneous inductor current 248 flowing through second inductor 236 is diverted through switch 254 to a path that bypasses load 204 (e.g., path to ground) instead of being delivered to the load. Conversely, by enabling sixth switch 254 and disabling fifth switch 252, substantially all of the instantaneous inductor current 248 flowing through second inductor 236 (e.g., less transistor conduction losses, switching losses, etc.) is provided to node 202. The duty factor ($D_6$) of sixth switch 254 determines the fraction of inductor current 248 ($I_{L2}$) in second inductor 236 that on average is supplied to capacitor 206. In turn, capacitor 206 smoothes the square wave supply current 249 waveform to generate load current 250 ($I_{LOAD}$) according to the duty factor and the inductor current, as follows: $I_{LOAD} = D_6 \times I_{L2}$.

As mentioned previously, the multi-stage configuration of device 200 including both first stage 228 and second stage 232 may provide one or more characteristics enabling device 200 to provide improved transient response as compared to first stage 228 alone. For example, in some embodiments, a first stage output voltage may be generated at first stage output node 230 that is greater than the average operational voltage seen by the load (i.e., voltage at node 202). The increased voltage may enable an increased amount of energy to be stored via one or more energy storage devices (e.g., capacitor 226) coupled to node 230, and this energy is subsequently deliverable to load 204 via second stage 232 in order to satisfy current transients. However, increasing the size of capacitor 226 and/or adding additional capacitors in order to store additional energy at node 230 may not be desirable in various scenarios. For example, there may not be sufficient space available to include such storage devices, for example, in mobile computing device scenarios. Furthermore, as the size of the energy storage devices of first stage 228 increases, the transient response time of the first stage similarly decreases, as greater time is needed to re-energize the larger energy storage devices (e.g., in scenarios where second stage 232 was unable to handle the additional current).

In order to further improve the transient response of device 200, the energy storage devices of second stage 232 (i.e., second inductor 236 and second capacitor 206) may be substantially smaller (i.e., configured to store less energy) than first inductor 212 and first capacitor 226, respectively, thereby enabling the second stage to respond to current transients faster than the first stage alone. As one non-limiting example, in applications providing a maximum of 30 A of load current, the first inductor may be 0.2 uH and the first capacitor may be 20,000 µF, whereas the second inductor may be 3 nH and the second capacitor may be 300 µF. The smaller sizes of the second stage energy storage devices (e.g., inductor 236 and/or capacitor 206) may enable integration of the second stage energy storage devices near the load, such as, for example, on the same package and/or on the same semiconductor die. Such a configuration may therefore provide the potential benefits of reduced size, reduced cost, and/or reduced parasitics (e.g., by no longer bringing the energy storage device nodes off-chip), among others. In some embodiments, the presence of second stage 232 may potentially relax the voltage ripple requirements at first stage output node 230, thereby allowing the use of a smaller capacitor (e.g., 4,700 µF) for first capacitor 226.

As yet another example of characteristics providing for an improved transient response, the switches of the second stage may include fast, inexpensive, low-voltage transistors that may be able to switch at high frequencies while experiencing minimal switching losses as compared to switches 216 and 218 of first stage 228, as described above. For example, in the briefly-mentioned 30 A example above, the first stage may switch at 300 kHz, whereas the second stage may switch at 20 MHz. Further, in some embodiments, current parking switching mechanism 238 may be configured to switch at a frequency higher than either the first stage switching mechanism or the second stage switching mechanism, such as, for example, at 100 MHz. It will be appreciated that these scenarios are intended to be non-limiting, and each switching mechanism of device 200 may be configured to switch at any particular frequency without departing from the scope of the present disclosure.

Controller 220 may be implemented as a "dual-loop" controller, where a first, low-frequency control loop 260 modulates controls signals 222 and 224 to set the first stage output voltage at first stage output node 230. As mentioned previously, this voltage may be equal to the desired load voltage at load 204, less than the desired load voltage, or greater than the desired load voltage. A second, high-frequency control loop 262 modulates control signals 244, 246, 256, and 258 to provide the desired output voltage at node 202 (e.g., voltage seen by the load).

Generally speaking, second stage 232 may control the voltage seen by load 204 at node 202 while also providing rapid response to changes in load current demand so as to maintain this voltage. Either second stage switching mechanism 234 or current parking switching mechanism 238 may be omitted from second stage 232 in some embodiments, as mentioned above. For example, second stage switching mechanism 234 may be omitted, or, conversely, switch 242 may remain enabled while switch 240 remains disabled. Example operation of such a configuration will now be described.

During steady-state operation (i.e., substantially constant load current 250), inductor current 248 in second inductor 236, and thus supply current 249, may remain substantially constant. Such operation may be provided, for example, by disabling switch 252 and enabling switch 254. In other embodiments, steady state operation may include toggling switches 254 and 252 at a particular duty factor operable to provide load current at a desired, constant level.

In response to a sudden increase in current demand from load 204, controller 220 may be configured to modulate control signals 256 and 258 provided to current parking switching mechanism 238 in order to increase load current 250. Providing the increased load current may include, for example, toggling control signals 256 and 258 with a duty factor that is greater that than the steady-state duty factor. As one non-limiting example, in a first portion of a modulation cycle (e.g., a single 20 MHz cycle), switch 252 is enabled while switch 254 is disabled, thereby disconnecting the downstream end of second inductor 236 from load 204 and instead connecting the downstream end to ground. During this first portion, inductor current 248 in second inductor 236 increases so as to, upon reconnecting inductor 236 to load 204 (i.e., during a second portion of the modulation cycle), both satisfy the increased demand for load current and recharge capacitor 206. In other words, during the first portion, the capacitor is discharged to provide load current 250 while load 204 is disconnected from inductor 236. During a second portion of the modulation cycle, switch 254 is enabled while switch 252 is disabled, thereby delivering the increased inductor current 248 to load 204 and capacitor 206. The size of each such "portion" of the modulation cycle (i.e., the duty factor) of the signal may be adjusted by controller 220 to provide a particular load current 250.

In contrast, if current demand decreases suddenly, the voltage at node 202 momentarily increases while second inductor 236 works to decrease inductor current 248. Specifically, inductor current 248 may decrease at a characteristic frequency of a tank circuit (LC circuit) including the second inductor and the second capacitor, where the characteristic frequency (f) of the tank circuit is related to the inductance (L) of the second capacitor and to the capacitance (C) of the second capacitor, as follows:

$$f = \frac{1}{2\pi\sqrt{LC}}.$$

In contrast, if first stage 228 were directly coupled to load 204, the decrease in load current 250 may be handled according to the characteristic frequency of the tank circuit formed by first inductor 212 and first capacitor 226. Since second inductor 236 and second capacitor 206 are typically much smaller than first inductor 212 and first capacitor 226, respectively, it will be appreciated that the characteristic frequency, and thus the response time of the second stage to decreased current demands, is similarly reduced.

Although the above-described operation is provided where second stage switching mechanism 234 is omitted or otherwise "disabled," the use of the second stage switching mechanism may provide various potential benefits. For example, as briefly mentioned above, second stage switching mechanism 234 and current parking switching mechanism 238 may cooperate to provide an average inductor current 248 in second inductor 236 that is a greater in magnitude than supply current 249. The extra energy provided by the increased inductor current 248 is stored by second inductor 236, and is therefore available to satisfy future increases in current demand. Such an approach where extra energy is stored (or "parked") in inductor 236 will be referred to herein as "current parking." It will be appreciated that although inductor current 248 is increased in such scenarios, the switching of current parking switching mechanism 238 and/or second stage switching mechanism 234 ensures that load current 250 remains at a level demanded by load 204 (e.g., substantially constant).

Starting with first stage 228, current parking may proceed as follows. First stage 228 provides a particular first stage output voltage at first stage output node 230 by controlling the states of switches 216 and 218 of first stage switching mechanism 210 with signals 222 and 224, respectively. Typically, the first stage output voltage may be substantially equivalent to the desired output voltage at node 202, but first stage 228 may provide any particular first stage output voltage by selectively enabling switches 216 and 218 without departing from the scope of the present disclosure.

Second stage 232 is then controlled by control signals 244, 246, 256 and/or 258 from controller 220 to both "park" current in second inductor 236 and to provide a desired amount of the parked current to the load. Generally speaking, current parking may be achieved by adjusting the duty factor(s) of control signals 256 and 258 applied to current parking switching mechanism 238, where the duty factor corresponds to how much of inductor current 248 (e.g., 50%, 80%, etc.) is provided to output node 202. In other words, a given duty factor may be used to provide a certain percentage of the available inductor current 248 in second inductor 236 to node 202, with the duty factor being increased or decreased to respectively increase or decrease the current percentage supplied to the downstream components.

For example, the steady-state value of inductor current 248 in second inductor 236 may be set to 1.2× the current demand from load 204 by setting the duty factor of fifth control signal 256 at ⅚. Further, as sixth switch 254 occupies a complimentary state compared to fifth switch 252, the duty factor of sixth control signal 258 is set at ⅚. In other words, in order to provide average inductor current 248 that is 20% larger than load current 250 at steady-state, fifth switch 252 is enabled for ⅙ of each modulation cycle of second control loop 262. As described above, the ideal load current 250 may be substantially equal to inductor current 248 multiplied by the duty factor of sixth switch 254. Accordingly, as the duty factor is ⅙ and inductor current 248 is 1.2× greater than a demanded load current, the actual load current 250 is equal to the demanded load current, thereby maintaining a substantially constant output voltage at node 202. Upon detecting an increased demand for load current 250 by load 204, the "parked" inductor current 248 in second inductor 236 may be immediately provided to the load, less the switching time of the switching mechanisms.

As mentioned above, the switching mechanisms of second stage 232 may be configured to utilize planar MOSFETs that are capable of switching at very fast speeds (e.g., 100 ps to 10 ns), which therefore enables second stage 232 to provide improved transient response as compared to first stage 228 alone. Lacking second stage 232, device 200 would be much slower to respond to transients due to the time required to vary inductor current 214 current in first inductor 212 in response to changes in load current demand. Therefore, the presence of the very fast second control loop 262 alleviates concerns about the slow first control loop 260 used to control the first stage.

Second stage switching mechanism 234 may be further configured to improve response of device 200 to decreased current demand (i.e., a negative current transient) by enabling sinking of the excess current. As mentioned above, lacking second stage switching mechanism 234, the ability of device 200 to respond to negative current transients depends upon the characteristic frequency of the LC circuit formed by second inductor 236 and second capacitor 206. However, by enabling third switch 240 and disabling fourth switch 242, for example, the upstream end of the second inductor is shorted to ground. Accordingly, the negative load current 250 is discharged to ground through inductor 236 at a rate that is dependent upon the current response of second inductor 236 (e.g., based on size of second inductor 236). As described above, the maximum (ideal) current response from an inductor is defined as the voltage divided by the inductance. Thus, in one example embodiment where second inductor 236 is 3 nH and the output voltage at first stage output node 230 is 2V, the maximum current response is 0.33 A/ns.

In some embodiments, the excess current may be handled even faster by also switching switches 252 and 254 of current parking switching mechanism 238 in addition to the above-described control of second stage switching mechanism 234. For example, by setting the duty factor of sixth switch 254 (e.g., via sixth control signal 258) to a particular value $D_6$, where $0<D_6<1$ (and thus setting the duty factor of the fifth switch to $1-D_6$), the effective load current 250 near-instantaneously (e.g., less switching time, etc.) becomes equal to $D_6$ multiplied by inductor current 248. In other words, excess current from load 204 may be dumped to ground via fifth switch 252 instead of being supplied to the downstream end of second inductor 236.

Although device 200 has been described as independently providing load current 250 to load 204, it will be appreciated that, in other embodiments, device 200 may include a single "phase" of a multi-phase electric power conversion device. In such scenarios, additional current may be provided at node 202 by one or more other phases. In other words, each individual phase may be configured to provide a subset of the overall load current 250 (e.g., each phase provides a portion of the current with different phase shift), thereby potentially decreasing the size (e.g., due to decreased power handling) of various components of each phase.

In yet other embodiments, current from additional phases may be provided at first stage output node 230. In this way, first stage 228 may be configured to supply a subset of the current to second stage 232 while the remaining phases supply the rest. In yet other embodiments, first stage 228 may supply multiple second stages 232, so as to allow each second stage to operate as a different phase. Thus, the components of each second stage may be sized to handle an even smaller amount of current, thereby enabling the use of even smaller components and thus potentially providing improved transient response. Generally speaking, the voltage provided to the one or more second stages may be provided by "slower" mechanisms of the one or more first stages, while the faster second stage(s) remain to provide a fast response to load transients. If the other phases were instead connected directly to load 204 at node 202 as mentioned above, the response is dependent upon the response (e.g., based on inductor size) of the additional phase(s).

The above-mentioned additional phases may include a two-stage configuration similar to device 200, a single-stage configuration, and/or any other suitable configuration without departing from the scope of the present disclosure. In some instances, the additional phases may be disabled during "normal" operation, and may only be enabled upon determination that a first phase is presently incapable of providing the desired current to the load. As one non-limiting example, one or more typical single-stage phases (e.g., device 100 of FIG. 1) may provide the entirety of load current 250 consumed by load 204 during steady-state operation, whereas one or more two-stage phases (e.g., device 200) provide the additional load current during a current transient.

Regardless of the specific configuration of phases, in order to effect appropriate control over the remaining components of device 200, controller 220 may be configured to monitor various components and/or nodes of device 200. For example, controller 220 may be configured to receive node voltage 264 (e.g., voltage input from electric power source 208), node voltage 266 (e.g., first stage output voltage at node 230), and/or node voltage 268 (e.g., output voltage at node 202). Controller 220 may incorporate such information into control loops 260 and 262 and/or into different logic in order to effect modulation of control signals 222, 224, 244, 246, 256, and/or 258. In some embodiments, controller 220 may be configured to estimate one or more currents (e.g., inductor current 214, inductor current 248, load current 250, etc.) from the measured voltage(s). In other embodiments, controller 220 may be configured to measure one or more currents via various current sensing mechanisms. It will be appreciated that these scenarios are presented for the purpose of example, and controller 220 may be configured to measure and/or estimate any one or more voltages and/or currents within device 200 in order to provide such modulation without departing from the scope of the present disclosure.

Monitoring of nodes and/or components enables controller 220 to provide a desired first stage output voltage at first stage output node 230, a desired output voltage at node 202, and/or any other suitable output(s). Such monitoring may further enable controller 220 to adjust first control loop 260 and/or second control loop 262 in order to dynamically respond to changes in operating conditions. For example, such monitoring may enable controller 220 to detect current transients at load 204 and to subsequently manipulate the control signals in response.

However, it will be appreciated that by simply monitoring other components of device 200, controller 220 may not detect future current demands sufficiently ahead-of-time in order to suitably respond to the changes (e.g., to park current in inductor 236, increase the first stage output voltage at first stage output node 230, etc.). Thus, in some embodiments, controller 220 may be configured to provide "parked" current and/or an increased first stage output voltage all the time during steady-state operation in anticipation of future transients. However, as current parking and/or increased charge storage effects some power losses (e.g., due to switching losses, "on" resistance across transistor channels, etc.), such a configuration may not provide suitable performance in some scenarios (e.g., mobile device scenarios or other low-power applications).

As such, in other embodiments, controller 220 may utilize one or more learning mechanisms in order to anticipate future demands. For example, controller 220 may learn that the current demanded from load 204 drops substantially below an average observed load current immediately preceding a large increase in demand. For example, if load 204 is a GPU, the load current demand may drop substantially in an idle period before a new frame is rendered. Accordingly, upon detecting such a drop-off in current, controller 220 may be configured to park current in inductor 236 and/or increase the first stage output voltage at first stage output node 230, according to previously-observed current demands. Thus, when rendering occurs and the appropriate components are brought online, suitable current may be provided. It will be appreciated that such scenarios are presented for the purpose of example, and are not intended to be limiting in any manner.

Figure 3:
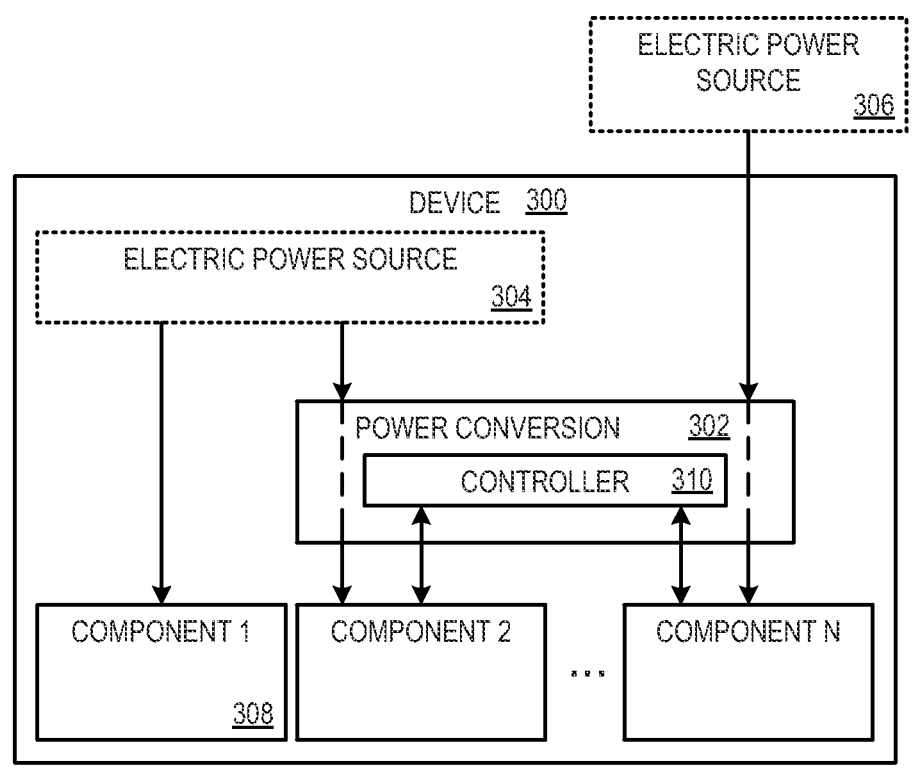
FIG. 3 schematically illustrates an example electronic device including an electric power conversion device according to an embodiment of the present disclosure.

However, in some embodiments, it may be desirable to provide more intelligent control over the operation of device 200. For example, turning now to FIG. 3, an electronic device 300 (e.g., computing device) including an electric power conversion device 302 according to an embodiment of the present disclosure (e.g., electric power conversion device 200) is illustrated. In some embodiments, device 300 may include electric power source 304 (e.g., internal battery) and/or may be operatively coupled to one or more external electric power sources 306 (e.g., mains power).

Device 300 includes a plurality of components 308, illustrated as an arbitrary number N of components (e.g., logic blocks, discrete components, etc.). Some components of device 300, for example "Component 1," may be configured to interface directly with one or more of electric power source 304 and 306. Component 1, for example, may be configured to operate from the voltage supplied by the power source(s) and/or may include one or more internal regulation mechanisms. Other components of device 300, for example "Component 2" may be operatively coupled to power conversion device 302. In addition to receiving electric power from device 302, such components may be configured to interact with controller 310 (e.g., controller 220) of electric power conversion device 302. For example, controller 310 may be configured to monitor one or more nodes of the components in order to anticipate future current demands in a manner similar to the monitoring the "local" nodes described above in reference to FIG. 2. In other words, a change in node voltage or current may provide a "trigger" to controller 310 in order to effect current parking, increase stored charge, and/or otherwise prepare device 302 for a change in current demand.

In some embodiments, the components 308 interacting with controller 310 may be configured to provide a trigger (e.g., one or more signals) to controller 310 alerting the controller of future current demands. For example, upon leaving a low-power mode, one or more components 308 may be configured to provide a signal to controller 310 alerting the controller that an increase in load current may soon be needed. Accordingly, controller 310 may be configured, for example, to start parking current and/or increasing the voltage on node 230 upon receipt of such trigger. As another non-limiting example, one or more components 308 (e.g., processing pipeline component(s)) may be configured to provide a signal to the controller upon receipt of a particular architectural instruction within a processing pipeline that will require idle execution mechanisms to come online in a few clock cycles, such as, for example, the fetching of a floating point instruction.

It will be appreciated that these triggers are presented for the purpose of example, and that the electric power conversion device described by example hereto may be configured to respond to any suitable trigger, or combination of triggers, without departing from the scope of the present disclosure.

Figure 4:
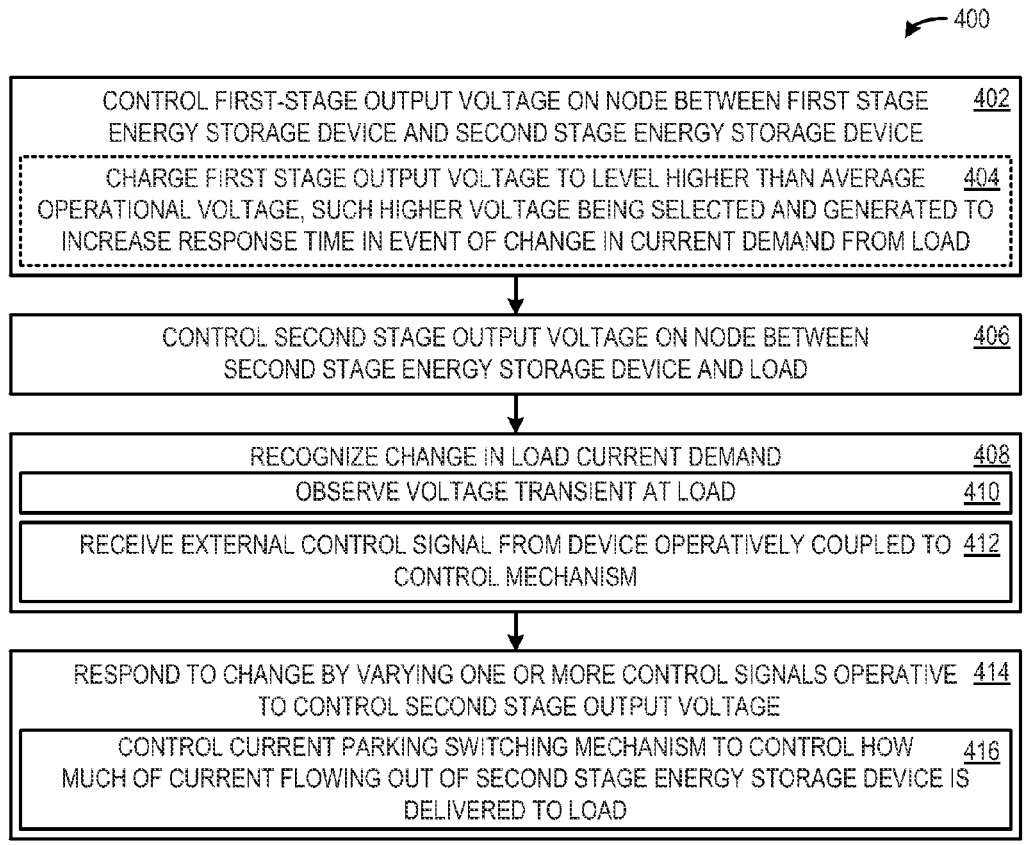
FIG. 4 illustrates a process flow showing an example method for operating an electric power conversion device.

Turning now to FIG. 4, an example method 400 for providing power to a load, such as a piece of computing logic, and for responding to transient current demands of the load is illustrated. As shown at 402, method 400 includes, with a control mechanism operatively coupled to the first stage energy storage device and the second stage energy storage device, controlling a first stage output voltage on a node between the first stage energy storage device and the second stage energy storage device. As mentioned above, the first stage output voltage (e.g., voltage at node 230 of FIG. 2) may comprise a value that may be different than the second stage output voltage (e.g., voltage at node 202 of FIG. 2). For example, in some embodiments, controlling the first stage output voltage may include charging of the first stage output voltage to a level higher than an average operational voltage required by the load during a range of operating conditions, such higher voltage being selected and generated to increase response time in the event of a change in current demand from the load. In other words, the voltage difference effected by charging the first stage output voltage to a level that is greater than what is needed, on average, by the load, may enable a multi-stage electronic conversion device comprising such a control mechanism (e.g., device 200) to provide an improved transient response over single-stage devices.

At 406, method 400 further includes controlling a second stage output voltage on a node between the second stage energy storage device and the load. As described above, the characteristics of the energy storage devices are selected such that (i) the second stage energy storage device has a relatively lower storage capacity than the first stage energy storage device and (ii) the control mechanism can cause the second stage output voltage to vary faster than the first stage output voltage.

Despite changes in current demand from the load, it is typically desirable to maintain the second stage output voltage at a particular voltage. As such, method 400 further includes, at 408, recognizing a change in load current demand. In some embodiments, recognizing the change in load current demand may include observing a voltage transient at the load. For example, if load current demand increases, the voltage seen at the output node will drop until adjustments are made via the control mechanism. However, as mentioned above, such observation of node voltages and/or currents may not provide information to the control mechanism suitably ahead-of-time, thereby resulting in decreased performance. In some embodiments, recognizing the change in load current demand may include receiving an external control signal from a device operatively coupled to the control mechanism. In other words, an external control signal may be provided by an external device suitably ahead-of-time such that the control mechanism can prepare for the change in current demand.

Regardless of the mechanism(s) by which the control mechanism is made aware of a change in load current demand, method 400 further comprises, at 414, responding to the change in load current demand by varying one or more control signals (e.g., via PWM, PFM, etc.) operative to control the second stage output voltage. In other words, as a change in load current demand either causes an increase or decrease in the second stage output voltage, responding to the change in load current demand may be configured to return the output voltage to a desired voltage. For example, responding to the change in current demand may include, at 416, controlling the current parking switching mechanism to control how much of the current flowing out of the second stage energy storage device is delivered to the load. In other words, if load current demand increases, increased current (e.g., current "parked" in the second stage energy storage device) may be provided to the load in order to return the second stage output voltage to a desired level.

Aspects of this disclosure have been described by example and with reference to the illustrated embodiments listed above. Components that may be substantially the same in one or more embodiments are identified coordinately and are described with minimal repetition. It will be noted, however, that elements identified coordinately may also differ to some degree. The claims appended to this description uniquely define the subject matter claimed herein. The claims are not limited to the example structures or numerical ranges set forth below, nor to implementations that address the herein-identified problems or disadvantages of the current state of the art.

The invention claimed is:

1. An electronic circuit, comprising:
a first stage switch coupled between an electric power source and a first upstream node associated with a first inductor;
a first capacitor coupled to a first downstream node associated with the first inductor;
a second stage switch coupled between the first downstream node and a second upstream node associated with a second inductor;
a current parking switch coupled between a second downstream node associated with the second inductor and a second capacitor at an output node; and a controller circuit configured to:
cause the first stage switch to adjust a first current within the first inductor based on a first voltage associated with the first downstream node and a first desired voltage;
cause the second stage switch to adjust a second current within the second inductor based on an average value for an output voltage associated with the output node and a second desired voltage, wherein an average current in the second inductor is greater in magnitude than a supply current provided to the output node; and
cause the current parking switch to further adjust the second current by enabling the second current to flow to either the output node or ground based on the output voltage and the second desired voltage.

2. The electronic circuit of claim 1, wherein the controller circuit comprises a first control loop configured to adjust the first current to regulate an average first voltage according to the first desired voltage, and a second control loop configured to adjust the second current to regulate an average output voltage that substantially tracks the second desired voltage.

3. The electronic circuit of claim 2, wherein the second control loop is further configured to cause the current parking switch to increase the second current in response to a decrease in the output voltage.

4. The electronic circuit of claim 2, wherein the second control loop is configured to operate at a higher frequency than the first control loop.

5. The electronic circuit of claim 1, wherein the first stage switch comprises:
a first switch coupled between a supply node of the electric power source and the first upstream node;
a first control signal configured to enable the first switch to provide a low resistance path from the supply node to the first upstream node;
a second switch coupled between a ground node and the first upstream node; and
a second control signal configured to enable the second switch to provide a low resistance path from the ground node the first upstream node.

6. The electronic circuit of claim 5, wherein the controller circuit is configured to adjust the first current by varying a first duty factor for the first control signal and a second duty factor for the second control signal.

7. The electronic circuit of claim 6, wherein the first duty factor and the second duty factor are varied according to pulse width modulation.

8. The electronic circuit of claim 1, wherein the second stage switch comprises:
a first switch coupled between the first downstream node and the second upstream node;
a first control signal configured to enable the first switch to provide a low resistance path from the first downstream node to the second upstream node;
a second switch coupled between a ground node and the second upstream node; and
a second control signal configured to enable the second switch to provide a low resistance path from the ground node the second upstream node.

9. The electronic circuit of claim 1, wherein the current parking switch comprises:
a first switch coupled between the second downstream node and the output node;
a first control signal configured to enable the first switch to provide a low resistance path from the second downstream node to the output node;
a second switch coupled between a ground node and the second downstream node; and a second control signal configured to enable the second switch to provide a low resistance path from the ground node the output node.

10. The electronic circuit of claim 9, wherein the controller circuit is configured to adjust the second current by varying a first duty factor for the first control signal and a second duty factor for the second control signal.

11. The electronic circuit of claim 10, wherein the controller circuit is configured to increase the second current by increasing a duty factor for the first control signal in response to a transient decrease in the output voltage.

12. The electronic circuit of claim 1, further comprising a load circuit coupled to the output node.

13. The electronic circuit of claim 12, wherein the second stage switch, and current parking switch, and the load circuit are implemented within the same semiconductor die.

14. The electronic circuit of claim 13, wherein switching transistors comprising the second stage switch and the current parking switch are fabricated to include a higher-voltage gate oxide within the semiconductor die than a gate oxide of transistors comprising the load circuit.

15. The electronic circuit of claim 13, wherein switching transistors comprising the first stage switch are fabricated to include a higher-voltage gate oxide than a gate oxide of transistors comprising the load circuit.

16. The electronic circuit of claim 12, wherein the load circuit is configured to alert the controller circuit in advance of increasing current demand.

17. The electronic circuit of claim 16, wherein the controller circuit is configured to increase a duty factor associated with the current parking switch in response to the alert.

18. The electronic circuit of claim 1, wherein the second inductor is configured to store less energy than the first inductor.

19. The electronic circuit of claim 1, wherein the second capacitor is configured to store less energy than the first capacitor.

20. The electronic circuit of claim 1, wherein the controller circuit is further configured to provide the average current at 20% larger than the supply current provided to the output node.

* * * * *